March 2, 1943.                T. B. HOLLIDAY                2,312,336
                              INDICATING DEVICE
          Filed April 16, 1941                  2 Sheets-Sheet 1
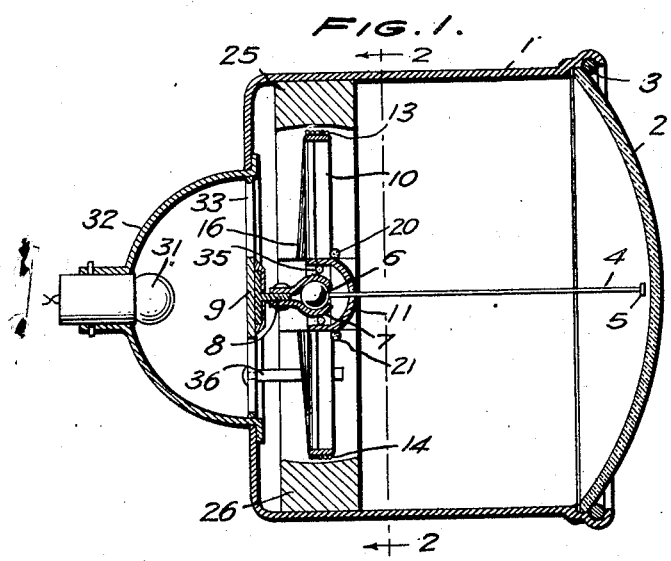
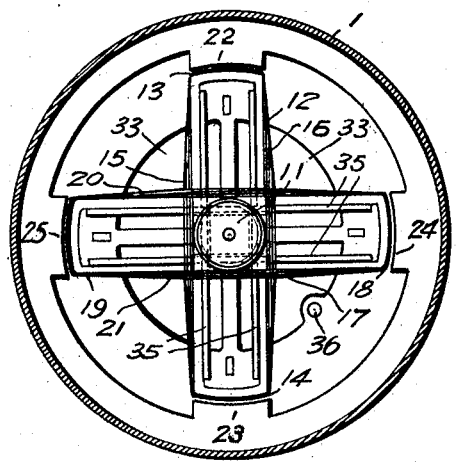
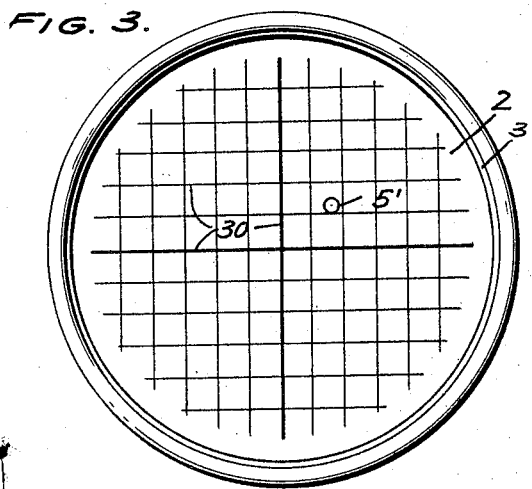
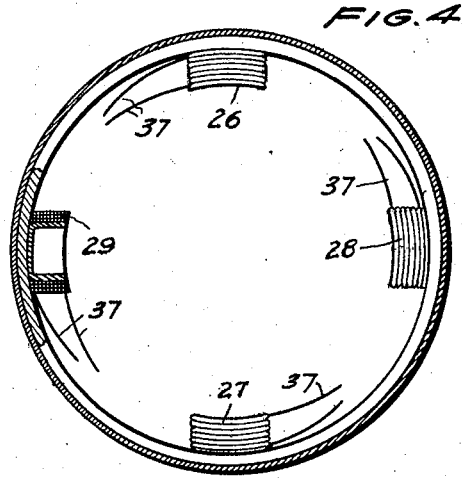
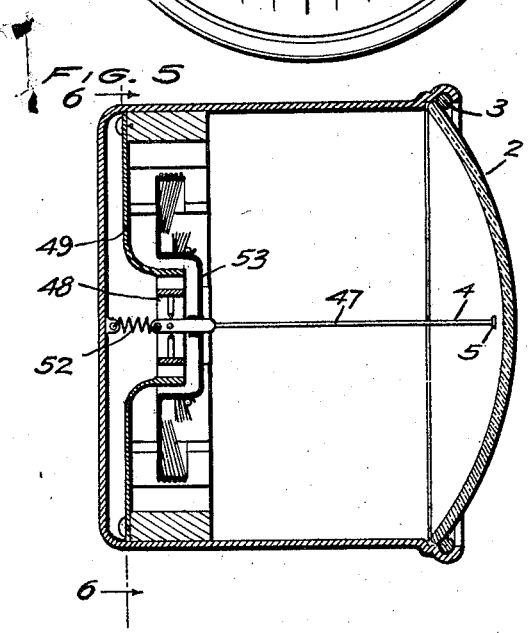
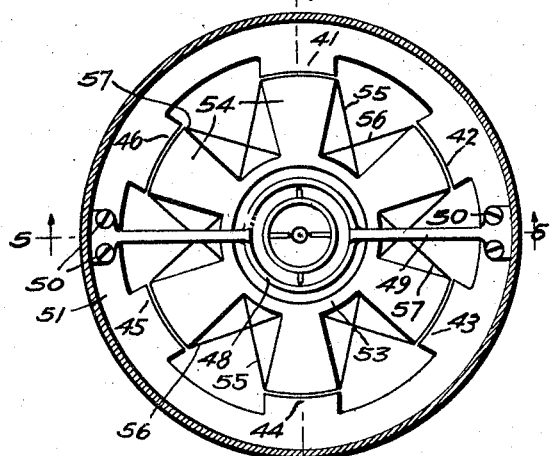
INVENTOR
THEODORE B. HOLLIDAY
ATTORNEYS March 2, 1943.    T. B. HOLLIDAY    2,312,336
INDICATING DEVICE
Filed April 16, 1941    2 Sheets-Sheet 2
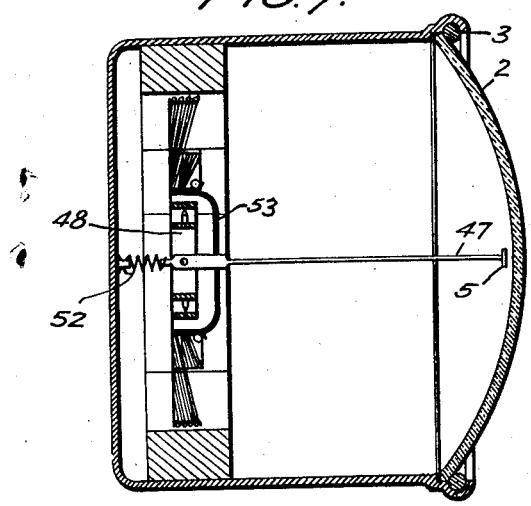
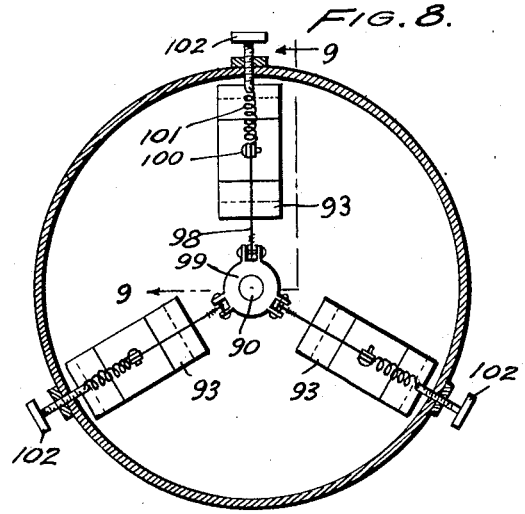
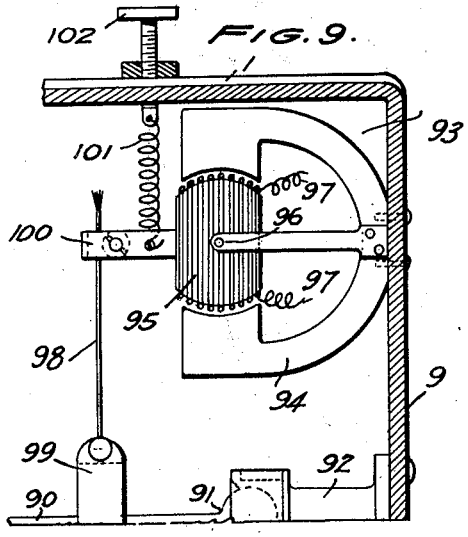
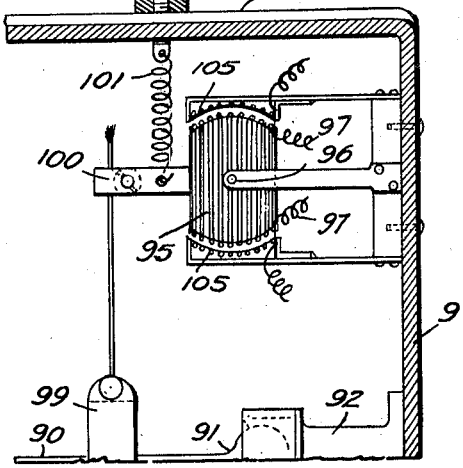
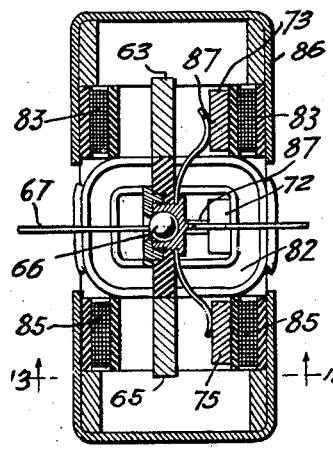
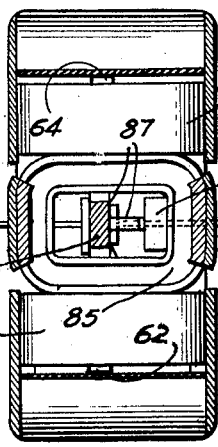
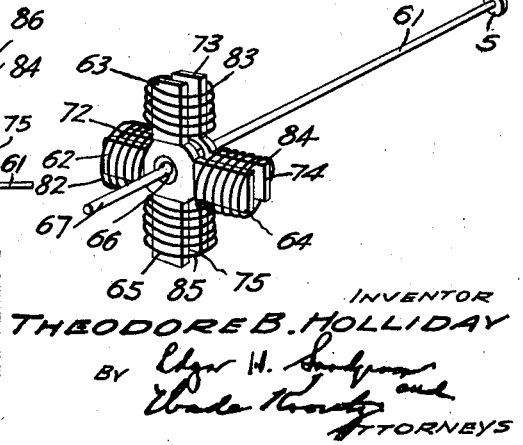
INVENTOR
THEODORE B. HOLLIDAY
ATTORNEYS Patented Mar. 2, 1943

2,312,336

UNITED STATES PATENT OFFICE 2,312,336

INDICATING DEVICE

Theodore B. Holliday, Dayton, Ohio

Application April 16, 1941, Serial No. 388,821

9 Claims. (Cl. 177—327)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument having an indicating element such as a pointer mounted for universal movement for indicating by graphical representation the resultant of a plurality of combined quantities or functions.

It is often desirable to be able to observe by graphical representation the resultant of two or more vector quantities or functions, acting in combination. When the functions are converted into electrical or mechanical effects, such effects are commonly observed independently in two or more indicating instruments, each instrument having an indicating element responsive to a single one of the functions. This practice requires the reading of a plurality of instruments simultaneously, and laborious computing, or plotting, before significant results are obtained. It is an object of the present invention, therefore, to provide an instrument having a single indicating element which will instantaneously indicate the resultant effect of a plurality of functions acting simultaneously. This is done by providing an indicating element, or pointer, which is mounted for limited universal movement in a plurality of directions, and causing said element, or pointer, to be influenced simultaneously in different directions in response to the values of the respective functions. It is a particular object of the invention to provide apparatus for making the values of individual functions effective in separate planes, or directions, to produce a significant resultant deflection of a single indicating element. A further object is to provide an inexpensive and rugged instrument for indicating by graphic representation the vector sum, or difference, of a plurality of vector components.

One very useful application of the concept of the invention is the provision of an indicator having a pointer influenced in one direction according to the values of a first function, and influenced in a direction at right angles to the first direction in accordance with the values of a second function, as in a cathode ray oscilloscope. A reference scale in the form of rectangular or other suitable coordinates is associated with the pointer to produce a graphic indication of its relative positions or path of movement. Thus, where only two functions are involved, the value of each, as well as the combined effect, or resultant, is at once apparent from the position of the pointer on the reference coordinates, and movement of the pointer may be readily traced by the eye.

Other useful applications of the present invention will be apparent to one skilled in the art, since any number of functions, within certain limits, may be introduced into the indicating device by providing responsive means for each function movable to influence the pointer in a particular plane or direction, each function thereby producing an effect in a plane or direction significant of that function, the responsive means collectively causing the pointer to assume a position corresponding to the resultant of all the functions. If the functions do not vary, the pointer will become stationary. If any of the functions are variable, the pointer will trace a path indicating the variable resultant effect.

Other objects and advantages of the invention will become apparent from the following specification and attached drawings illustrating a number of preferred embodiments. It is to be understood that the specific embodiments illustrated and described herein are intended only as illustrative of the principles of the invention, and are not to be construed as limitations in the practice thereof.

In the drawings:

Fig. 1 is a longitudinal section through an instrument employing two movable coils.

Fig. 2 is a transverse section taken on the line 2—2 of Fig. 1.

Fig. 3 is a front view of the instrument shown in Fig. 1 as it would appear on an instrument panel.

Fig. 4 is a view taken similarly to Fig. 2, but omitting the moving parts, and illustrates a modification in which field coils have been substituted for permanent field magnets, certain parts being shown in section.

Fig. 5 is a longitudinal section through a modification having three movable coils and is taken on the line 5—5 of Fig. 6.

Fig. 6 is a sectional view taken on the line 6—6 of Fig. 5.

Fig. 7 is a longitudinal sectional view taken on line 7—7 of Fig. 6.

Fig. 8 is a transverse sectional view of a further modification employing three separate instruments for actuating a single pointer.

Fig. 9 is an enlarged sectional view taken on the line 9—9 of Fig. 8.

Fig. 10 corresponds to Fig. 9 but illustrates a modification having field coils substituted for the permanent field magnets shown in the device of Figs. 8 and 9.

Fig. 11 is a schematic perspective view of a further modification.

Fig. 12 is a longitudinal sectional view of an instrument constructed according to the schematic showing in Fig. 11.

Fig. 13 is a sectional view taken on the line 13—13 of Fig. 12.

The instrument shown in Fig. 1 comprises a casing 1, a convex glass or viewing screen 2, secured in the casing by means of a snap-ring or the like 3, and a pointer element 4 carrying a small disc 5 which is movable in all directions closely adjacent the screen 2. To provide for movement of the disc 5 in all directions the pointer element 4 is carried by a ball 6, capable of limited universal angular movement in a bearing socket 7, which is supported by means of a bracket 8 upon a rear wall 9 of the casing 1.

Pointer element 4 also carries an insulating spider or the like 10 supporting a pair of coils 12 and 17. As shown in Figs. 1 and 2 the spider supports these coils at right angles to each other and normal to the pointer element 4. Spider 10 is provided with a central web or hub-like portion 11 for maintaining the coil supports in the described relation and for integrally uniting them with the pointer element 4. The coil 12 comprises active end portions 13 and 14 and bundles of wires 15 and 16 joining the said end portions. The coil 17 comprises active end portions 18 and 19 and bundles of wires 20 and 21 joining these end portions. The two coils 12 and 17 are electrically independent of each other, and each is provided with flexible leads for connection with separate energizing circuits. Adjacent the active coil portions 13, 14, 18, and 19 are permanent magnet pole pieces 22, 23, 24 and 25, respectively.

Thus it will be understood by one skilled in the art that when the coil 12 is energized by a direct current the conductors in the portions 13 and 14, passing adjacent the permanent magnet pole pieces 22 and 23 respectively, will be deflected laterally carrying the pointer element and disc 5 through a certain arc of motion. If the coil 12 is wound as shown and the pole 23 has a polarity opposite from the pole 22, a direction of current which, for instance, would tend to move the conductors at 13 back from the plane of the drawing in Fig. 2, or to the left as viewed in Fig. 1, would tend to produce motion of the portion 14 in the opposite direction, and the resulting couple would, under these conditions, move the disc 5 upwardly when the device is in the position illustrated.

In the same manner, if the coil 17 is energized so as to produce a couple tending to move the active coil portion 18 inwardly from the plane of the drawing in Fig. 2, and the active coil portion 19 outwardly from the plane of the drawing in Fig. 2, the disc 5 will be caused to move inwardly from the plane of the drawing in Fig. 1, or to the right when the instrument is viewed from the front.

It will be readily understood that the influences tending to produce motions in the two directions, as described, are independent of each other and may occur separately or simultaneously. If they occur simultaneously, due to the simultaneous energization of both coils 12 and 17, then the disc 5 will move both to the right and upwardly as viewed from the front, as shown in Fig. 3, the numeral 5' indicating the apparent position of the disc 5 behind the glass 2. In Fig. 3 the glass 2 is illustrated as provided with a reference scale or grid 30 to make readily apparent by casual glance the direction and extent of any deflection from the central or neutral position. The reference grid may be patterned after rectangular coordinates having their origin at the center of the glass as shown in Fig. 3, or the axis may be shifted so that the disc 5 will always move within one quadrant; or, if desired, the grid may take the form of any other coordinate system, such as polar coordinates. If a record is desired, the pointer 4 may be provided with a writing instrument for marking upon a card supported in the present position of the screen 2.

It was previously assumed that the pole 23 is of opposite polarity from the pole 22, and that pole 24 is of opposite polarity from the pole 25. Thus, if 22 were a north pole, 23 would be a south pole, and 24, for instance, might also be a north pole and 25 a south pole. Then if the coils 12 and 17 were similarly wound and similarly connected to their respective circuits, a direction of current which would deflect the disc 5 upwardly would also deflect it laterally to the right, in Fig. 3, which are the positive directions in the upper right quadrant of the rectangular coordinate system.

If the instrument is intended to be flood-lighted from the front, the glass 2 may be transparent and may have the reference grid 30 etched or painted thereon, so that the disc 5 is visible through the glass as it moves behind the grid markings. However, it is often desirable to provide individual instrument lighting, and to this end the embodiment shown in Fig. 1 is provided with the lamp 31 and the reflector 32 secured to the rear wall 9. The rear wall 9 is provided with a plurality of openings 33 designed to transmit a diffused light to the inner surface of the glass 2. With this lighting arrangement the glass 2 would preferably be translucent, serving as a screen upon which is projected the shadow 5' of the disc 5.

Means to center the pointer element 4 comprises a plurality of needles 35 of magnetic material carried by the coil-supporting forms constituting the spider 10. These needles, in aligning themselves with the magnetic flux between the opposite pole pieces, resiliently maintain the pointer element 4 in its central position without the use of springs. In lieu of needles, small pieces of magnetic material may be mounted near the extremities of the legs of the spider 10 and adjacent the pole pieces of the permanent magnets. The spider 10, the coils 12 and 17, and the pointer element 4, constituting an armature assemblage, may be balanced by positioning the ball support 6 at the center of gravity of this movable assemblage so that relatively little magnetic force is required to center the pointer. A pin 36 may be provided on the rear wall 9 to prevent undesired rotation of the armature assemblage.

The instrument shown in Figs. 1 and 2 is provided with permanent field magnets 22, 23, 24 and 25; and for that reason is a direct-current instrument only. However, by merely substituting the field coils 26, 27, 28 and 29 shown in Fig. 4 for the aforesaid permanent field magnets (in order named), the instrument may be used on either direct current or alternating current. In all other respects, Figure 4 duplicates the parts showing of Figures 1 and 2. Individual leads 37 are brought out from each field coil so that the top and bottom coils 26 and 27 can be connected in circuit with the coil 12, and the side coils 28 and 29 can be connected in circuit with the coil 17. The substitution of field coils for permanent magnets in alternating-current instruments is well understood in the art and is not believed to require further explanation, since it does not change the principle of the invention or the operation of the instrument.

The modification shown in Figs. 5, 6, and 7 differs from the instrument shown in Figs. 1 and 2 chiefly in the provision of three movable coils and the use of gimbal rings for a universal pivot for the pointer element. In other respects the instrument shown in Figs. 5, 6, and 7 is essentially similar to the two-coil instrument just described. Similar parts are indicated by like reference characters. The field magnets in this modification comprise the poles 41 to 46, inclusive, arranged so that north and south poles alternate. Thus if 41, 43, and 45 are assumed to be north poles, then 42, 44, and 46 will be south poles. A pointer 47 is mounted for limited universal movement in the gimbal rings 48 which are supported by the arms 49 secured by means of the screws 50 to a ring 51 carrying the pole pieces 41 to 46. A spring 52 is provided for centering the pointer 47.

Carried by the pointer 47 is a shell 53 having a plurality of coil-supporting arms 54 adapted to support the coils 55, 56, and 57 in operative relation to the poles of the field magnets. These coils are seen to be wound so that each has a portion adjacent a north pole and a portion adjacent a south pole, thereby producing a couple or turning moment when the coil is energized. For instance, as viewed in Fig. 6, the upper portions of the turns of coil 55 lie adjacent the assumed north pole 41, while the lower portions of the turns of this coil lie adjacent the south pole 44. When current is flowing in the coil, a magnetic couple will result, causing the pointer 47 to be deflected either up or down, depending upon the direction of the current. Similarly, one side of the coil 56 lies adjacent the assumed south pole 42, while the other side of this coil lies adjacent the assumed north pole 45. In coil 57 one portion lies adjacent the assumed north pole 43 and another portion lies adjacent the assumed south pole 46. To avoid confusion in the drawings, the leads for these coils are not shown, but it is understood that each coil, 55, 56, and 57, has its leads brought out separately through flexible connecting means to three separate sources of energization, representing three functions or influences to be introduced into the instrument.

By virtue of this construction and arrangement, a current flowing in the coil 55 will tend to produce a deflection of the pointer 47 in a vertical plane, a current flowing in the coil 56 will tend to produce a deflection of the pointer in a plane sixty degrees on one side of said vertical plane, and a current flowing in coil 57 will tend to produce a deflection of the pointer in a plane sixty degrees on the other side of the vertical plane, the sense of the deflection in each case depending upon the direction of the current. If two or three of the coils 55, 56, and 57 are energized simultaneously, the deflection of the pointer will assume a direction and magnitude representing the vector sum of the individual influences acting separately. In this manner a plurality of influences or functions may be added vectorially and the resultant indicated by a graphic representation in a single instrument. It is understood in the practice of the invention that the instrument is to be designed with a coil for each function under consideration and that the number of functions which may be compared need not be limited to two or three as in the embodiments herein shown. By providing an appropriate number of coils and corresponding field magnet poles, any number of functions within reasonable limits may be combined in an instrument of this type.

If the poles 41 to 46 are permanent magnets the instruments will, of course, not respond to alternating currents introduced into the coils 55, 56, and 57. If an alternating-current instrument is desired, the pole pieces may be replaced by field coils as described in connection with Fig. 4, the field coils being connected in circuit with their associated armature coils.

The sectional views in Figs. 5 and 7 illustrate in detail the manner of mounting the pointer 47 in gimbal rings 48, and a preferred manner of bundling the coils where they must overlap each other in passing around the central shell 53. The pivotal support for the pointer 47 in the gimbal rings should be at the center of gravity of the movable assemblage, or armature, so that the spring 52 will be required to exert only a very light tension to maintain the pointer 47 in the central position shown. Any deflection of the pointer 47 from this central position will then be resisted by the increasing tension of the spring 52.

Figs. 8, 9, and 10 illustrate a further embodiment of the invention wherein a pointer mounted for universal movement is influenced in a plurality of directions in response to separate instruments linked thereto. A pointer 90 carrying a disc at its end is provided with a universal mounting at 91 on the bracket 92 affixed to the rear wall 9 of the instrument casing 1. In this embodiment the pointer 90 is influenced in three different directions or planes by means of three similar instruments 93 disposed symmetrically about the pointer. The instruments 93 are represented as being of the direct-current permanent-field magnet type, each having a field magnet 94 and moving coil 95 pivoted at 96 between the poles thereof. Flexible leads 97 are provided for energizing the moving coils of each instrument from a separate circuit.

The moving coil 95 carries an arm 100 for transmitting the motion or deflection to the pointer 90 by means of a link 98. In the present embodiment the link 98 comprises a flexible tension member in the form of a fine wire or thread having one end attached to a ring 99 on the pointer 90 and having the other end secured by a clamp to the extremity of the arm 100. A spring 101 with a tension-adjusting screw 102 provides for centering the pointer 90 and adjusting the calibration of the device. In lieu of the flexible tension member 98, a rigid member may be used which will transmit compressive, as well as tension, forces to the pointer 90, but the construction is simplified by making the link 98 flexible and keeping it taut by spring means as shown.

The three instruments 93 are identical and, when properly adjusted, will return the pointer 90 to its central position when the coils are not energized. Energization of one of the instruments 93 will move the pointer 90 in a plane through the link 98 and the arm 100, the sense of movement depending upon the direction of the deflection of the coil 95. Thus, as in the preceding embodiments, simultaneous operation of more than one of the instruments 93 moves the pointer 90 to a resultant position representing the vector sum or difference of the functions controlling the currents in the coils 95.

Fig. 10 illustrates an adaptation of the instrument of Figs. 8 and 9 to alternating currents, the only difference over Fig. 9 being in the substitution of the field coil 105 for the permanent magnet 94, as was done in Fig. 4. In operation, the field coil 105 is connected in circuit with the moving coil 95 in each instrument.

In Fig. 11 there is shown schematically a still further modification employing the basic principles of the present invention. In this embodiment a pointer 61, carrying a plurality of vanes of magnetic material, 62, 63, 64, and 65, is mounted for limited universal movement upon a ball support or the like 66 on the end of a bracket 67. Stationary members of magnetic material, 72, 73, 74, and 75, are arranged adjacent, and paired with, the respective vanes 62, 63, 64, and 65. Surrounding each of these pairs, comprising a magnetic vane and a magnetic member such as 62, 72, etc., is a coil, the respective coils being designated by the numerals 82, 83, 84, and 85.

The modification shown in Fig. 11 may be used as either a D. C. or an A. C. instrument. When one of the coils 82 to 85 is energized, either by D. C. or A. C., the magnetic field produced therein will cause mutual repulsion of the magnetic vane and member so as to produce a magnitude of deflection of the pointer 61 corresponding to the repulsion forces produced by the coil. Thus, if the coils 83 and 85 are considered to be mounted on a vertical axis, energization of the upper coil 83 will tend to cause the vane 63 to move away from the stationary member 73 so as to produce an upward deflection of the pointer 61. Likewise, energization of the coil 85 will tend to produce a downward deflection of the pointer 61, and if both coils are energized simultaneously the resulting deflection of the pointer 61 will represent the vector sum or difference of the magnetic forces produced by the two coils 83 and 85.

The coils 82 and 84 are adapted to produce lateral deflections of the pointer 61 in a horizontal plane, the sense and magnitude of the deflection here again representing the vector sum of the magnetic forces produced by the two coils. If all the coils, or any other combination of coils less than all of them, are simultaneously energized, the resulting deflection of the pointer 61 will continue to represent the vector sum, or resultant, of the magnetic forces produced by the individual coils acting in the directions and senses determined by the angular positions of these coils about the pivot 66.

Figs. 12 and 13 represent sectional views taken through an instrument constructed according to Fig. 11, wherein the coils 82 to 85 are supported by a mounting ring 86 which may be carried within an instrument case such as the case 1 in Fig. 1, and the bracket 67 may be attached to the rear wall 9 of the case 1. It is to be understood that the end of the pointer 61 may be provided with a disc 5 as in Fig. 1, and that either a clear or translucent viewing screen or glass 2 will be provided adjacent the area of movement of the disc 5. A light spring 87 is provided to center the pointer 61 and to resiliently oppose the magnetic forces of repulsion. As in the previous embodiments, the movable parts form a unit mounted at its center of gravity so that the pointer 61 will be maintained in its central position with only very slight application of force from the spring 87, regardless of the position of the instrument case.

For purposes of illustration, the responsive elements which actuate the movable pointer in each embodiment have been limited to two, three, or four in number and have been arranged symmetrically about the pointer. In practice, the number of actuating elements corresponds to, and is determined by, the number of functions to be introduced into the instrument. Likewise, since this indicating device deals with vector quantities having direction and sense, as well as magnitude, the actuating means should be arranged about the pointer significantly with respect to the functions they represent, and the coordinate markings on the screen should significantly correspond to these functions.

For instance, the two-coil instrument of Figs. 1 and 2 and the four-coil instrument of Figs. 11, 12, and 13 are well adapted to represent a position in space. When the disc on the end of the pointer is caused to move over a screen having rectangular coordinate markings as shown in Fig. 3, the position in space may be illustrated in either a horizontal or vertical plane, depending upon the position and nature of the responsive devices actuating the coils of the instrument. In Figs. 1 and 2, the vertical coil 12 may be made responsive to vertical deviations from a reference elevation, and the horizontal coil 17 may be made responsive to lateral deviations from either side of a vertical reference plane, whereupon the position of the disc 5 will readily indicate both of these deviations, or the position in a vertical plane. If it is desired to determine the position in a horizontal plane in space, the major axes of the grid 30 may be considered to represent the four points of the compass, the coil 12 being energized in response to values of latitude, and the coil 17 being energized in response to departures in longitude.

A three-coil embodiment, such as is shown in Figs. 6 and 8, is particularly useful in graphically representing the resultant of three vector quantities where the angular relationship of the planes of action of the three coils corresponds to the angular relationship of the vector quantities to which the coils are responsive. It is, of course, obvious that the deflection of the pointer may be interpreted with respect to any chosen system of coordinates on the screen 2, regardless of the number of coils or independent functions involved.

While the invention has been described as having particular utility in determining a position in a plane in space, it is not intended to limit the invention thereto, as it is of utility in combining vector quantities representing variables or functions of any kind. The instruments disclosed herein are inexpensive to manufacture, are very rugged and durable, and require substantially no auxiliary apparatus, which considerations are critical in many fields of use. Further extensions and modifications will be apparent of those skilled in the art, and all such changes and modifications as fall within the scope of the appended claims are deemed to be a part of my invention. Having now described my invention and the manner in which the same may be used, what I claim as my invention and desire to secure by Letters Patent is:

1. An electrical indicating device comprising a pointer pivoted for deflection in a plurality of planes, and a plurality of electric motor means operable upon said pointer, each of said motor means being capable of displacing said pointer in one of said planes to a degree proportional to the amount of energization of said motor means.

2. In an indicating device, a casing, a translucent viewing screen in one side of said casing, a coordinate scale of markings on said viewing screen, a light source in the opposite side of said casing for illuminating the under surface of said viewing screen, and an indicating element having its base portion universally pivoted in said casing adjacent to said light source and its free end adapted to cast a shadow on said screen indicative of the coordinate position of said element.

3. In an indicating device, a pointer mounted for limited universal movement, a plurality of coils carried by said pointer and movable therewith, and stationary means for establishing magnetic fields through said coils whereby energization of said coils will produce a resultant deflection of said pointer, each of said coils producing a component of said resultant deflection.

4. In an indicating device, a pointer mounted for limited universal angular movement about a point, a plurality of coils carried by said pointer, and a plurality of pairs of stationary field coils, one pair of said field coils being associated with each of said first-named coils.

5. In an indicating device, a pointer mounted for limited universal movement, a plurality of vanes of magnetic material mounted on said pointer, a plurality of stationary members of magnetic material, one of said members being adjacent and paired with each of said vanes, and a coil surrounding each of said pairs comprising a magnetic vane and a magnetic member.

6. In an indicating device, a pointer mounted for limited universal angular movement, a plurality of vanes of magnetic material mounted on said pointer and extending in different directions therefrom, a stationary member of magnetic material adjacent to and paired with each of said vanes, and a coil around each of said pairs comprising a magnetic vane and a magnetic member, whereby energization of said coils will produce forces of repulsion between said vanes and members, causing a resultant deflection of said pointer.

7. In an indicating device, a pointer mounted for limited universal angular movement about a point, a plurality of stationary electric field producing means, and a like plurality of electric field responsive elements carried by said pointer, each of said pointer carried elements being capable of displacing said pointer to a degree proportional to the amount of energy imparted to its associated field producing means.

8. An indicating device comprising a pointer mounted for limited universal angular movement in all directions from a central position, a plurality of measuring instruments disposed about said pointer, each of said instruments having a movable member responsive to a value impressed upon said instrument, the deflection of each of said members being in a different plane and each of said planes including said pointer when the latter is in said central position, individual flexible wires connecting each of said movable members to said pointer, and individual means for adjustably tensioning each of said wires to effect zero positioning of said pointer and to calibrate said instrument.

9. A current responsive instrument comprising a plurality of pairs of opposed permanent magnet pole pieces lying in a plane, an element mounted for limited universal movement and carrying a plurality of coils between said opposed pole pieces, said element including said coils being constructed to lie substantially in a plane, and means to resiliently urge the plane of said element into the plane of said pole pieces comprising needles of magnetic material secured in the plane of said element and associated with said coils for alignment with the permanent magnetic flux therethrough.

THEODORE B. HOLLIDAY.